No. 748,137. PATENTED DEC. 29, 1903.
G. ZAHIKJANZ.
TURBINE.
APPLICATION FILED MAY 21, 1903.
NO MODEL. 3 SHEETS—SHEET 1.
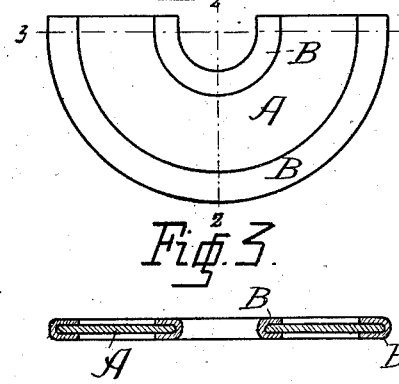
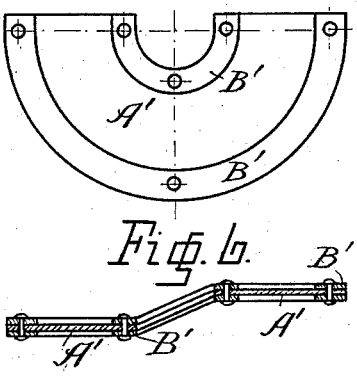
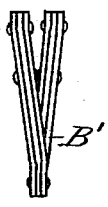
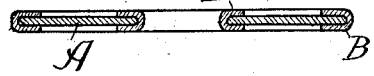
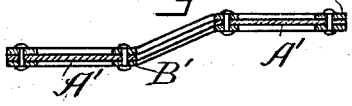
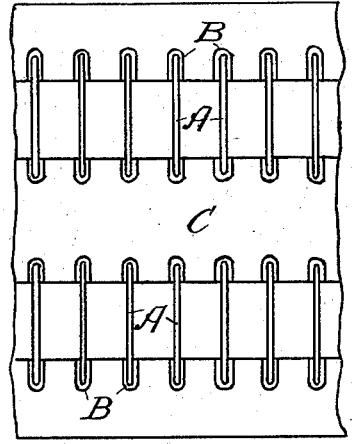
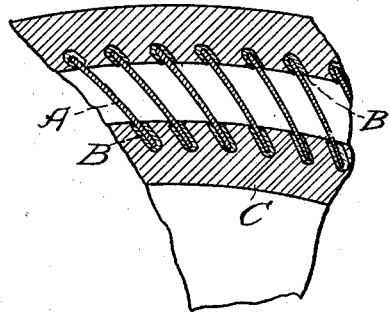
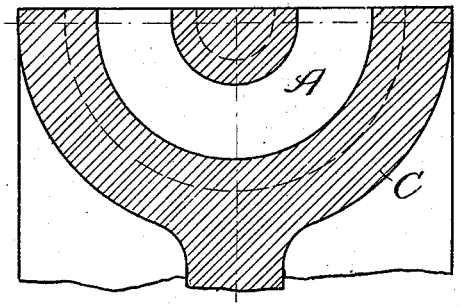

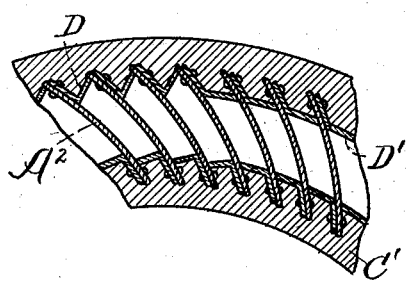
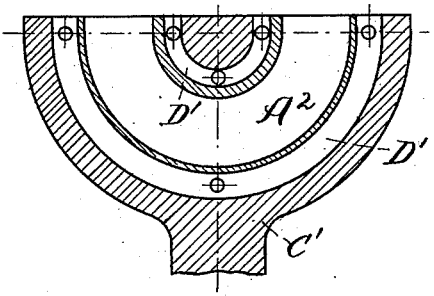
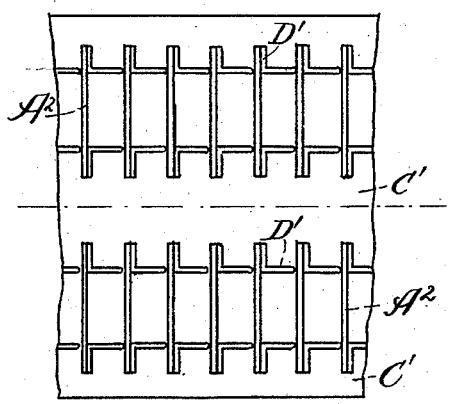

No. 748,137. PATENTED DEC. 29, 1903.
G. ZAHIKJANZ.
TURBINE.
APPLICATION FILED MAY 21, 1903.
NO MODEL. 3 SHEETS—SHEET 3.

No. 748,137.

Patented December 29, 1903.

UNITED STATES PATENT OFFICE.

GABRIEL ZAHIKJANZ, OF BERLIN, GERMANY, ASSIGNOR TO BERGMANN-ELEKTRICITÄTS WERKE AKTIENGESELLSCHAFT, OF BERLIN, GERMANY, A CORPORATION OF GERMANY.

TURBINE.

SPECIFICATION forming part of Letters Patent No. 748,137, dated December 29, 1903.

Application filed May 21, 1903. Serial No. 158,216. (No model.)

*To all whom it may concern:*

Be it known that I, GABRIEL ZAHIKJANZ, a subject of the Emperor of Russia, and a resident of 23 Schlegelstrasse, Berlin, Germany, have invented certain new and useful Improvements in Turbines, of which the following is a specification.

My invention relates to turbines intended to be driven by steam, gases, vapors, or liquid under pressure; and it consists of certain novel features hereinafter described and claimed.

The invention has for its object to so construct a turbine with U-shaped guide and rotary channels as to form windings of constant as well as of gradually-increasing cross-section for the passage of the driving medium.

Reference is to be had to the accompanying drawings, in which—

Figure 13:
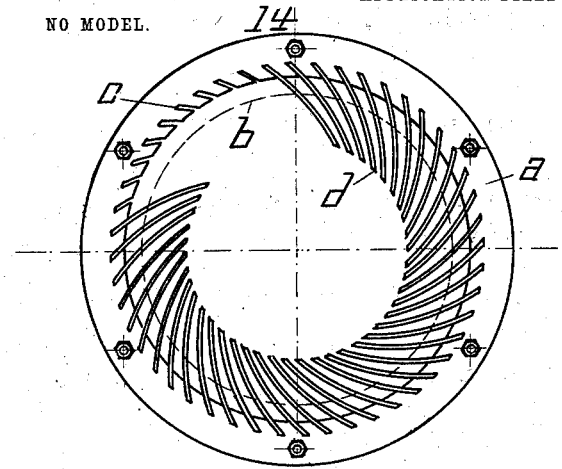
Figure 14:
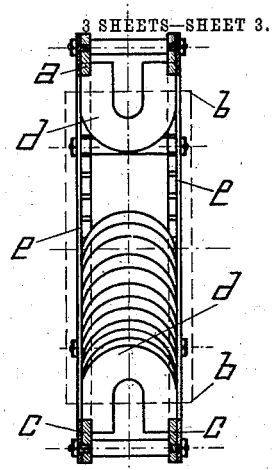
Figures 15, 16:
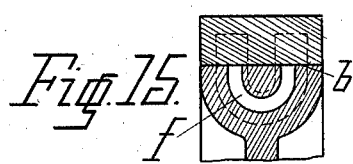
Figure 17:
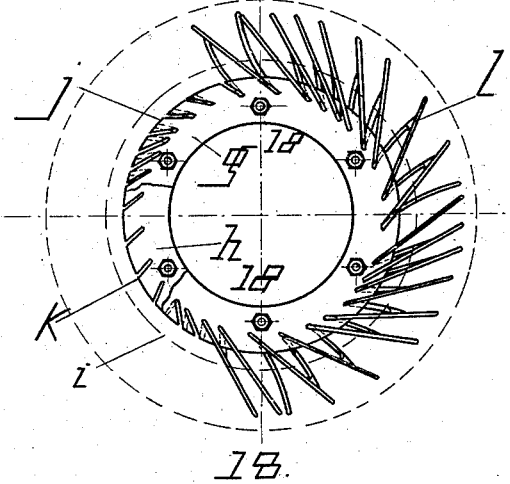
Figure 18:
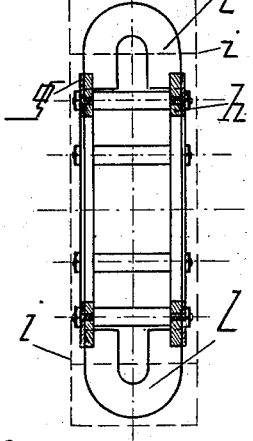

Figure 1 is a front view of a U-shaped rotary blade. Fig. 2 is a sectional view of the same on the line 2 2 of Fig. 1. Fig. 3 is a sectional view of the same on the line 3 3 of Fig. 1. Fig. 4 is a front view of a U-shaped guide-blade with ends twisted apart, so as to form a winding with the rotary blade. Fig. 5 is a lateral view of Fig. 4. Fig. 6 is a sectional view of Fig. 4 on the line 6 6. Figs. 7, 8, and 9 show a piece of the rotary wheel-rim with U-shaped channels formed by blades strengthened at the edges. Figs. 10, 11, and 12 show a piece of the rotary wheel-rim with U-shaped channels formed by blades provided with lateral walls and strengthened at the edges. Fig. 13 is a front view of a device for holding the rotary blades in proper position during the process of casting. Fig. 14 is a sectional view thereof on the line 14 14. Figs. 15 and 16 show a piece of the rotary wheel-rim cast by means of the device shown in Figs. 13 and 14. Fig. 17 is a front view of a device for holding the guide-blades in proper position during the process of casting. Fig. 18 is a sectional view of the same on the line 18 18.

To form U-shaped rotary and guide channels adapted to form windings for the passage of steam and other driving medium, I cut blades of metal—such as wrought-iron, steel, &c.—in form of a U, which by means of punches I conveniently bend or twist and then incase them at the outer and inner edges with molten metal, such as cast-iron. Since thick blades are injurious, causing resistance and whirls in the flow of the driving medium, I use very thin blades, which, however, I provide at the edges with strips of metal fastened in any convenient way to protect the edges of the blades against melting and burning away during the process of incasing them with molten metal. Thus Figs. 1, 2, and 3 show a U-shaped rotary blade A, provided at the edges with U-shaped metal strips B, slipped over.

Figs. 4, 5, and 6 show a twisted guide-blade A, provided at the edges with U-shaped strips B, riveted fast. In Figs. 7, 8, and 9 is shown a piece of a rotary wheel C, provided with blades. (Shown in Figs. 1, 2, and 3.) The blades are previously bent by punches, so as to form more convenient passages. The channels thus constructed have, however, the disadvantage of being laterally formed of cast metal, which is seldom smooth, and therefore presents resistance to the flow of the driving medium. To remedy this and to simplify the manufacture, I provide the U-shaped blades at the edges with lateral walls. These are advantageously formed of U-shaped metal strips conveniently punched, so as to protect the edges against melting and burning during the process of casting. Thus Figs. 10, 11, and 12 show a piece of a rotary wheel C, in which the U-shaped blades $A^2$ are provided with lateral walls riveted on the edges. The side walls may be rectangular, as shown at D at the left hand of Fig. 10, or concentrical, as shown at D' at the right hand of the same figure.

To simplify the process of incasing the U-shaped blades with molten metal and to obtain rotary and guide wheels exactly fitting each other, I use a device holding the blades in proper order and position. This is a frame to which the blades are fastened either by slipping them into slits or by screwing them or by riveting or in any other convenient way. The frame may be so arranged as to be used repeatedly. Thus Figs. 13 and 14 show a frame for casting the rotary wheel. The same consists of two rings $a$ with slits $c$ to receive the rotary blades $d$. After receiving all the blades the frame is provided with the needful cores and the molten metal is poured in. $b$ is the outward diameter of the rotary wheel, a piece of which after the process of casting is shown in Figs. 15 and 16, wherein $f$ denotes the U-shaped channel. After casting the frame is removed to be used again. Figs. 17 and 18 show the device for casting the guide-wheel. It consists of two rings $g$ and $h$ with respective slits $j$ and $k$, which receive the twisted guide-blades $l$, the intervals of which gradually increase, so as to form U-shaped guide-channels increasing in cross-section. $i$ is the inward diameter of the guide-wheel.

Both frames being exactly divisioned extremely facilitates the disposition of the blades and the construction of accurate guide and rotary wheels. In the case of using blades with lateral walls the process of casting by means of said frames is still more simplified.

What I claim as new, and desire to secure by Letters Patent, is—

1. A turbine having channels with blades the edges of which are sheathed or incased.

2. A turbine having channels and blades the edges of which are sheathed or incased in cast metal.

3. A turbine having channels with blades having their edges sheathed in U-shaped metal strips.

4. A turbine having channels with blades the edges of which are sheathed in U-shaped metal strips embedded in cast metal.

5. A turbine having channels with blades the edges of which are reinforced and embedded in cast metal.

6. A turbine having channels with blades the edges of which are reinforced by lateral walls.

7. A turbine having channels with blades and lateral walls extending from one blade to the next and forming a lining for said channels.

8. A turbine having channels with blades and lateral walls each of which has a member lying close against the edge portion of a blade and another member extending toward the adjacent blade and covering the wall of the channel.

In testimony whereof I have signed my name to this specification in the presence of two subscribing witnesses.

GABRIEL ZAHIKJANZ.

Witnesses:
   HENRY HASPER,
   WOLDEMAR HAUPT.